(12) United States Patent
Svensson et al.

(10) Patent No.: US 7,468,968 B2
(45) Date of Patent: Dec. 23, 2008

(54) SYSTEM AND METHOD FOR CONNECTING PERIPHERAL DEVICES TO A SUPPORTING NETWORK THROUGH A MOBILE STATION

(75) Inventors: Sven Anders Borje Svensson, San Diego, CA (US); Henrik Basilier, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1234 days.

(21) Appl. No.: 10/271,603

(22) Filed: Oct. 15, 2002

(65) Prior Publication Data

US 2004/0071122 A1  Apr. 15, 2004

(51) Int. Cl.
*H04Q 7/24* (2006.01)
*H04Q 7/28* (2006.01)
*H04J 3/24* (2006.01)

(52) U.S. Cl. .................. 370/338; 370/349; 370/341
(58) Field of Classification Search ............... 370/338, 370/395.52, 349, 469, 310.1, 401, 328, 210.1; 455/436, 556.1, 557.1
See application file for complete search history.

(56) References Cited

U.S. PATENT DOCUMENTS

| | | | |
|---|---|---|---|
| 6,246,688 B1 | 6/2001 | Angwin et al. | |
| 6,542,491 B1 * | 4/2003 | Tari et al. | 370/338 |
| 6,757,269 B2 * | 6/2004 | Dorenbosch et al. | 370/338 |
| 6,763,012 B1 * | 7/2004 | Lord et al. | 370/338 |
| 6,822,952 B2 * | 11/2004 | Abrol et al. | 370/338 |
| 6,853,851 B1 * | 2/2005 | Rautiola et al. | 455/553.1 |
| 6,876,640 B1 * | 4/2005 | Bertrand et al. | 370/331 |
| 6,947,400 B2 * | 9/2005 | Heller | 370/331 |
| 6,973,309 B1 * | 12/2005 | Rygula et al. | 370/338 |
| 6,996,085 B2 * | 2/2006 | Travostino et al. | 370/338 |
| 7,016,334 B2 * | 3/2006 | Cohen et al. | 370/338 |
| 7,039,033 B2 * | 5/2006 | Haller et al. | 370/338 |
| 7,054,322 B2 * | 5/2006 | D'Annunzio et al. | 370/401 |

(Continued)

FOREIGN PATENT DOCUMENTS

WO   WO0150783   7/2001

OTHER PUBLICATIONS

Telecommunication Industry Association: "TIA Interim Standard cdma 2000 Wireless IP Network Standard" TIA/IS-835-B, Sep. 2002 (pp. 1-98); XP002288685.
Frodigh, et al: "Wireless *ad hoc* networking—The art of networking without a network" (vol. 77, No. 4, 2000, pp. 248-263); XP000969933.

(Continued)

*Primary Examiner*—Tilahun B Gesesse
(74) *Attorney, Agent, or Firm*—Coats & Bennett, P.L.L.C.

(57) ABSTRACT

A mobile station serves as an aggregation point for connecting one or more peripheral devices to a Public Data Network through the mobile station's wireless link to a supporting wireless communication network. In an exemplary embodiment, the mobile station establishes a single PPP session with the network that includes a primary service instance for itself and an auxiliary service instance for each locally attached peripheral device. As such, the mobile station and the one or more locally attached peripheral devices share a single PPP session, permitting each device to have its own IP address and allowing the mobile station to provide Mobile IP messaging relay between Mobile IP clients in the attached devices and the supporting network. With this arrangement, the mobile station avoids IP packet routing overhead by directing traffic to the appropriate peripheral device using the service instance identifiers marking the packet data traffic received from the network.

40 Claims, 6 Drawing Sheets

U.S. PATENT DOCUMENTS

| | | | |
|---|---|---|---|
| 7,173,924 B2 * | 2/2007 | Shaheen et al. | 370/338 |
| 7,197,017 B1 * | 3/2007 | Rezaiifar et al. | 370/331 |
| 2002/0085530 A1 | 7/2002 | Akihiko | |
| 2002/0118663 A1 * | 8/2002 | Dorenbosch et al. | 370/338 |

OTHER PUBLICATIONS

3rd Generation Partnership Project 2 "3GPP2"; Wireless IP Network Standard; Version 1.0.0; Jan. 30, 2002; 14 pgs.

* cited by examiner

SYSTEM AND METHOD FOR CONNECTING PERIPHERAL DEVICES TO A SUPPORTING NETWORK THROUGH A MOBILE STATION

BACKGROUND OF THE INVENTION

The present invention generally relates to mobile station-based Internet service, and particularly relates to aggregating such service for one or more peripheral devices through the mobile station.

Mobile stations, such as cellular radiotelephone handsets, offer access to an increasing variety of data services that are principally enabled by the evolving packet data networks supporting such handsets. With the increasing data rates and the move toward comprehensive packet data services, such as all IP wireless networks, mobile stations increasingly represent "gateway" devices providing relatively high bandwidth access to the Internet at large, as well as to other Public Data Networks (PDNs) and/or private data networks.

Consequently, mobile stations offer at least the potential for aggregating multiple connections between the Internet (or other external networks) and various other devices, such as laptop computers, Portable Digital Assistants (PDAs), etc. Oftentimes, such devices have limited network connection capabilities, such as direct cable and/or short-range radio or optical network links and thus their mobile connectivity is extended through use of the mobile station's relatively long-range radio link and broad service areas.

In a first approach, a peripheral device connects to the mobile station through a local link, and the mobile station acts essentially as a relay unit by passing traffic and signaling between the supporting network and that peripheral device. One drawback of this approach is that the connection between the mobile station and its supporting network essentially is managed at the peripheral device and thus cannot conveniently be used by the mobile station for anything more than carrying traffic and messages for the peripheral device. Multiple peripheral devices generally equates to multiple Point-to-Point (PPP) sessions between the network and the mobile station.

A second approach overcomes the limitations of the relay mode described above, wherein the mobile station manages traffic for one or more devices based on performing IP address-based routing. That is, the mobile station directs traffic to the appropriate local peripheral device based on the IP address of the incoming data packets. While such an approach permits the mobile station to receive data packets for itself as well as for an attached peripheral, the IP routing requirements impose potentially significant processing overhead. Moreover, with the mobile station operating in this role, it is more or less necessary for the communication client, e.g., the Mobile IP client, to reside in the mobile station rather than in the attached peripheral device. Thus, connecting through the mobile station is more difficult since such connectivity may be somewhat at odds with nominal IP connection operations of the peripheral device.

SUMMARY OF THE INVENTION

The present invention comprises a method and apparatus for connecting peripheral devices, such as laptop computers, etc., to a wireless communication network through a mobile station. In an exemplary embodiment, the mobile station uses multiple "service instances" to support such attachment. Thus, the mobile station establishes a PPP session with the supporting network and a "primary service instance" for itself on that PPP session, and then establishes an additional, "auxiliary service instance" for each locally attached peripheral device on the same PPP session. With this approach, each local peripheral device may have its own separately addressed "IP session" managed by the device's Mobile IP client, with the mobile station transparently relaying Mobile IP messages, such as routing agent advertisements and registration requests, between the devices and the supporting network.

Of further benefit, with each device having its own service instance, the Quality-of-Service provided for each device may be set according to the particular needs of that device's connection. Additionally, because the mobile station establishes its own service instance, i.e., the primary service instance, it retains its ability to actively communicate on its own packet data connection with the network simultaneously with any active peripheral device connections. That is, the mobile station and the locally attached peripheral devices "share" a logical PPP connection. With this approach, the PPP signaling is carried on the primary service instance but the auxiliary service instances carry the IP payloads for corresponding ones of the peripheral devices connected to the mobile station.

An additional advantage of distinguishing the peripheral devices by service instance is that the supporting network "marks" packet data traffic sent to the mobile station with the appropriate service instance identifiers. Thus, the mobile station differentiates between traffic targeted to it and different ones of the peripheral devices based on the traffic's service instance identifiers. This service instance differentiation is preferably performed by the mobile station at the Layer 2 network level, which allows it to direct traffic to the peripheral devices based on Layer 2 switching rather than based on Layer 3 (IP address-based) routing, which would impose undesirable processing overhead on the mobile station.

In at least one exemplary embodiment, the mobile station is a cdma2000 mobile station, such as a cellular radiotelephone, and the supporting network is a cdma2000 network. To connect a given peripheral device with the network, the mobile station performs initial authentication and registration with the network, and establishes the PPP session and primary service instance. Then, for each locally attached peripheral device, it requests an additional auxiliary service instance. The mobile station may do this, for example, responsive to recognizing the attachment of a peripheral device or responsive to user input.

Regardless, the mobile station supports interaction between the peripheral device and the supporting network by relaying Mobile IP messages (or other messaging traffic). For example, in response to receiving the auxiliary service instance requests from the mobile station, the network responds by sending a "foreign agent" advertisement on each auxiliary service instance. The mobile station "relays" these advertisements to the attached peripheral device(s), thereby enabling them to generate registration requests, e.g., Mobile IP registration requests, which are relayed from the devices to the network by the mobile station. Thus, the mobile station supports Mobile IP messaging between the peripheral devices and the supporting network.

Further, in one or more exemplary embodiments the mobile station supports direct or indirect negotiation of QoS parameters for each of the auxiliary service instances. In this manner, the IP session provided to a streaming media application running on an attached laptop computer may be afforded different QoS settings than an email application running on an attached Portable Digital Assistant (PDA), for example.

In any case, use of multiple service instances to support an IP connection per attached peripheral device allows the mobile station to manage the overall PPP session while providing each peripheral with the opportunity to manage its own separately addressed IP connection. This approach permits "client" applications within the peripheral devices to have separately addressed IP connections yet avoids the need for multiple PPP sessions. Thus, the approach can simplify the local connections between the mobile station and peripheral devices, which yields flexibility regarding the type of connections that can be established between the mobile station and the locally attached peripheral devices.

DETAILED DESCRIPTION OF THE INVENTION

Figure 1:
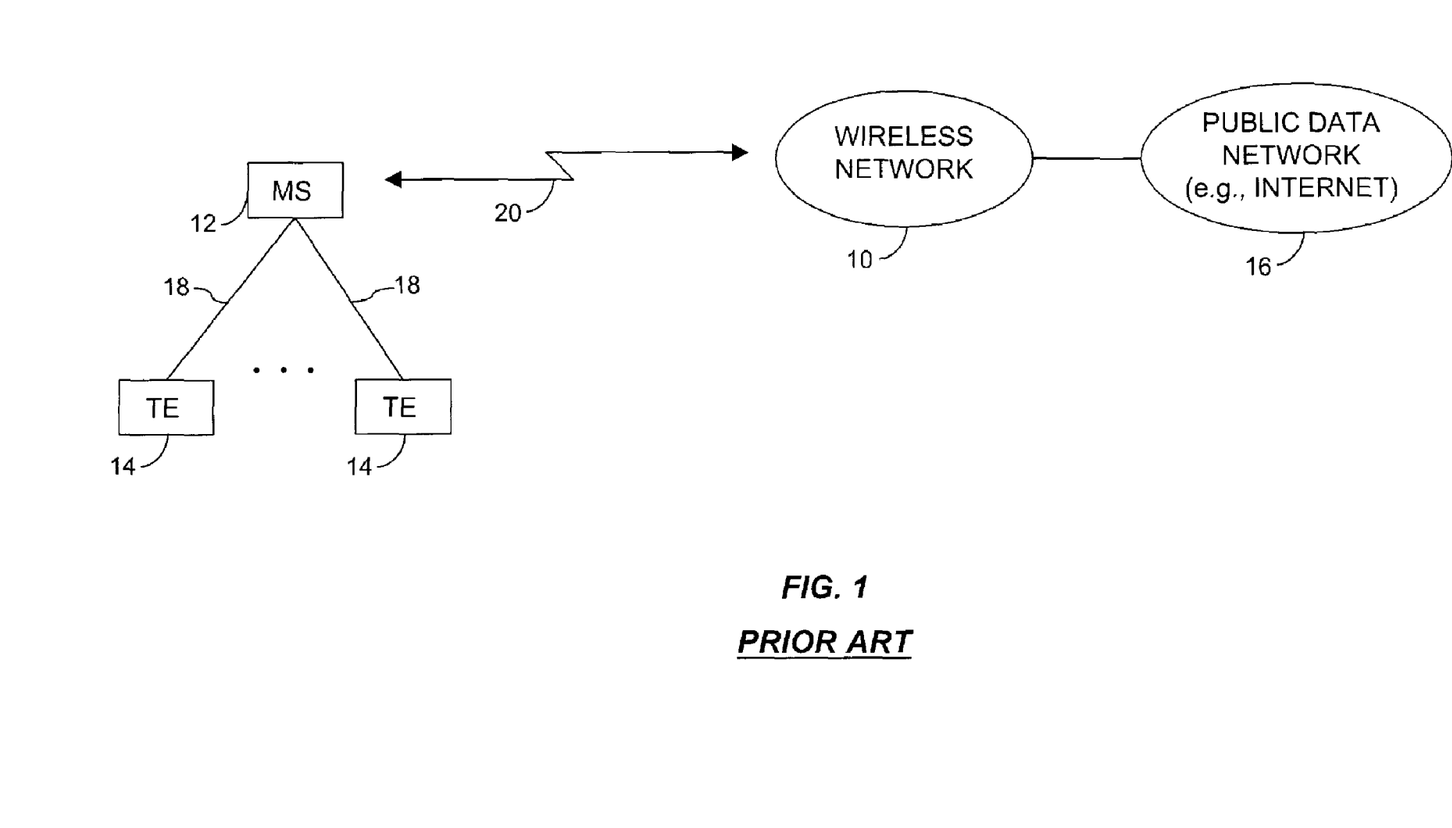
FIG. 1 is a diagram of a conventional wireless network and a mobile station supporting the attachment of one or more peripheral devices.

FIG. 1 illustrates a wireless communication network 10 and a mobile station 12 providing conventional connection support between one or more terminal elements (TEs) 14, otherwise referred to herein as "peripheral devices," and a Public Data Network (PDN) 16, such as the Internet. With such an arrangement, the TEs 14 communicatively couple to the mobile station 12 through local connections 18, and the mobile station 12 communicatively couples to the network 10 through a wireless link 20. Thus, the TEs 14 use the mobile station 12 and supporting wireless network 10 to communicate with the PDN 16.

Those skilled in the art will recognize that the general description given above and the accompanying illustration are simplified, however, such simplified presentation is nonetheless a sufficient basis from which to discuss the conventional approach to supporting peripheral device connections from a mobile station. That is, in the context of FIG. 1, the link 20 between the mobile station 12 and the network 10 represents one or more channels of the air interface used by network 10 to communicate with and control mobile stations 12. Generally, mobile station 12 establishes a packet data session with network 10, and, in support of the connected peripheral devices 14, the mobile station 12 routes or relays packet data traffic to each one of the peripheral devices 14 based on the IP addresses included in the incoming data packets, assuming that each peripheral device 14 has a different IP address.

Thus, in one conventional approach, the mobile station 12 acts as a Layer 3 router that inspects the IP header information of incoming data packets at the Layer 3 protocol level, consistent with the layer definitions used in the seven-layer OSI Network Reference Model. With such an approach, the mobile station 12 directs individual data packets to their intended (targeted) peripheral device 14 based on Layer 3 IP address routing. While that approach has the advantage of permitting the mobile station 12 to send and receive its own data differentiated by its own IP address, it does impose significant processing burden on it.

Alternatively, the mobile station 12 might forego its ability to send and receive its own IP traffic while supporting the attached peripheral devices 14 so that its packet routing is simplified. With this approach, the mobile station 12 takes on the role of an "IP switch" rather than a full-fledged router, and switches incoming data packets to the targeted peripheral devices 14 at the OSI Layer 2 level.

Figure 2:
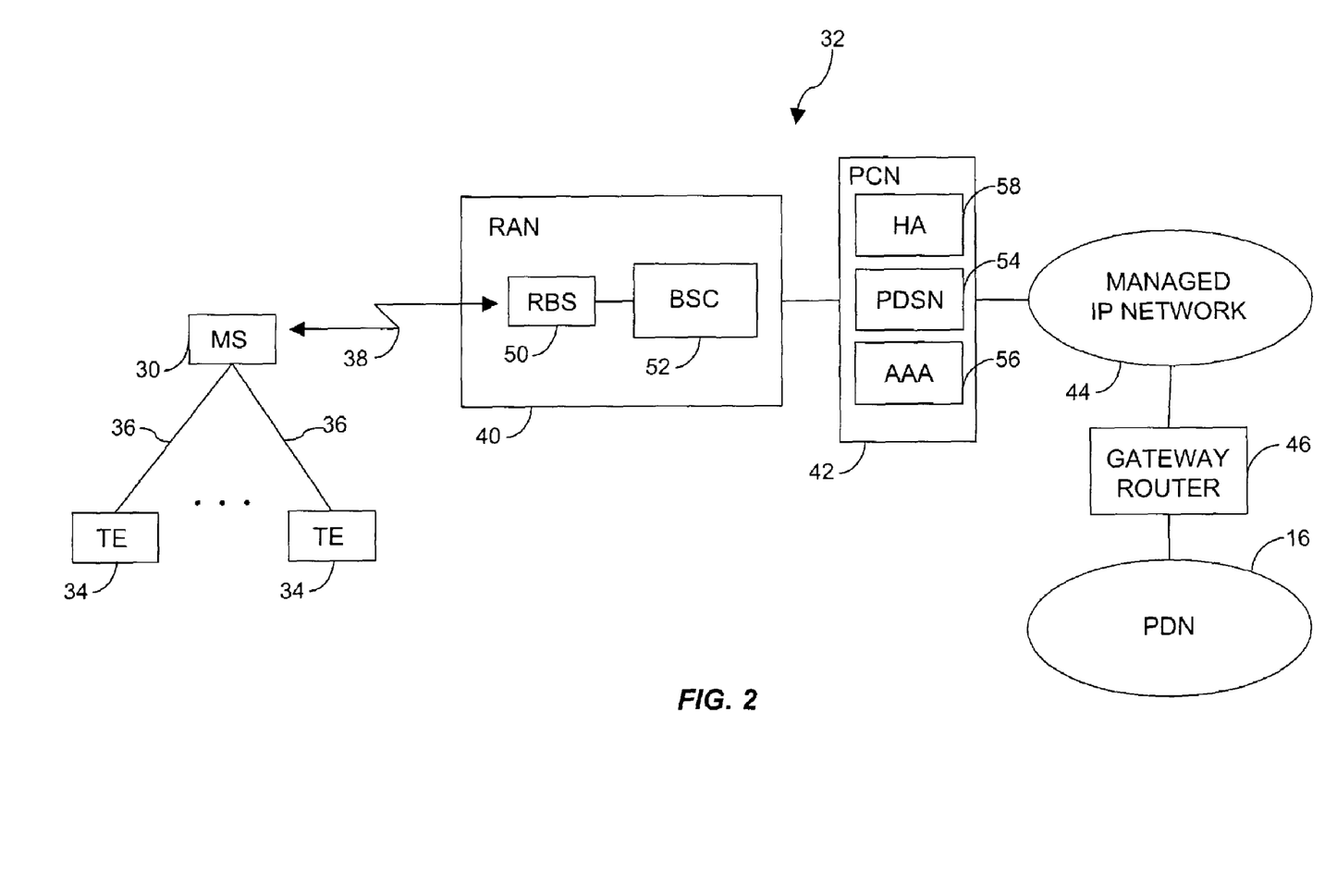
FIG. 2 is a diagram of an exemplary wireless communication network and an exemplary mobile station supporting one or more embodiments of the present invention.

In contrast to either of the two scenarios above, FIG. 2 illustrates an exemplary mobile station 30 that uses a single PPP session supporting multiple "service instances" to communicatively couple one or more peripheral devices 34 to a wireless communication network 32 and, ultimately, to the PDN 16, e.g., the Internet. The mobile station 30 maintains a wireless link 38 with network 32, which comprises a Radio Access Network (RAN) 40 coupled to a Packet Core Network (PCN) 42, which is in turn coupled to the PDN 16 through a managed IP network 44 and associated gateway router 46. Together, RAN 40 and PCN 42 permit the mobile station 30 to establish a data session with network 32 that supports the transfer of packet data between PDN 16 and the mobile station 30, and/or any peripheral devices 34 that might be locally attached to mobile station 30.

In exemplary embodiments, RAN 40 comprises one or more Radio Base Stations (RBSs) 50 and one or more supporting Base Station Controllers (BSCs) 52. In an actual implementation, RAN 40 would likely comprise numerous BSCs 52, each supporting one or more RBSs 50, with the sets of RBSs 50 and BSCs 52 distributed across a given geographic region to establish one or more cellular service areas.

Regardless, an exemplary PCN 42 includes a Packet Data Serving Node (PDSN) 54, an Authentication, Authorization, and Accounting (AAA) server 56, and a Home Agent (HA) 58. Note that the PDSN 54 may include or be associated with a Foreign Agent (FA) that provides packet tunneling from the home networks of visiting mobile stations 30.

In operation, the mobile station 30 establishes a data session with network 32, including a PPP session terminated by the mobile station 30 and the PDSN 54. The PPP session is supported by a Radio-Packet (R-P) session established between the BSC 52 and the PDSN 54. Incoming data packets from PDN 16 are routed to PDSN 54, which selectively sends packets addressed to mobile station 30 to BSC 52 for delivery. To support such functionality, BSC 52 may include or be associated with a Packet Control Function (PCF) that serves as an IP-based interface between BSC 52 and PDSN 54. Regardless, in typical operation, BSC 52 receives the incoming data packets, processes/formats them, and then directs them to the appropriate RBS 50 for transmission to the mobile station 30. Data from the mobile station 30 follows essentially the same path but in a reverse flow.

As noted, a given user may connect one or more peripheral devices 34 to mobile station 30 such that the mobile station's wireless link 38 may be used by the locally attached peripheral devices 34 to communicate with network 32 and, ultimately, with PDN 16. Thus, mobile station 30 serves as an "aggregation" point, potentially connecting several such peripherals, e.g., laptop, PDA, etc., to the network 32. Thus, the mobile station 30 requests a service instance for each locally attached peripheral, such that the collection of peripheral devices and the mobile station 30 share the single PPP session. This arrangement allows each peripheral device 34 to function with its own Mobile IP client, to be assigned its own IP address, and permits the use of different Quality-of-Service (QoS) settings for one or more of the service instances.

Despite the ability to use a different IP address per peripheral device service instance, routing overhead is avoided in the mobile station 30. To avoid such routing overhead, the mobile station 30 performs OSI Layer 2 switching on the incoming data packets it has received from the network based on service instance identification information, and wherein network 32 "marks" the data packets for each service instance with a service instance identifier (SR_ID).

As noted above, in at least some embodiments, the use of multiple service instances permits differing QoSs to be used for each locally attached peripheral device 34. The use of differentiated QoSs may make sense where, for example, one peripheral device 34 is engaged in a streaming media application, or other type of packet data application with minimum throughput and jitter constraints, where another peripheral device 34 may be engaged in simple email transfer and/or web browsing, where maximum throughput may be important, but jitter is not critical.

Figure 3:
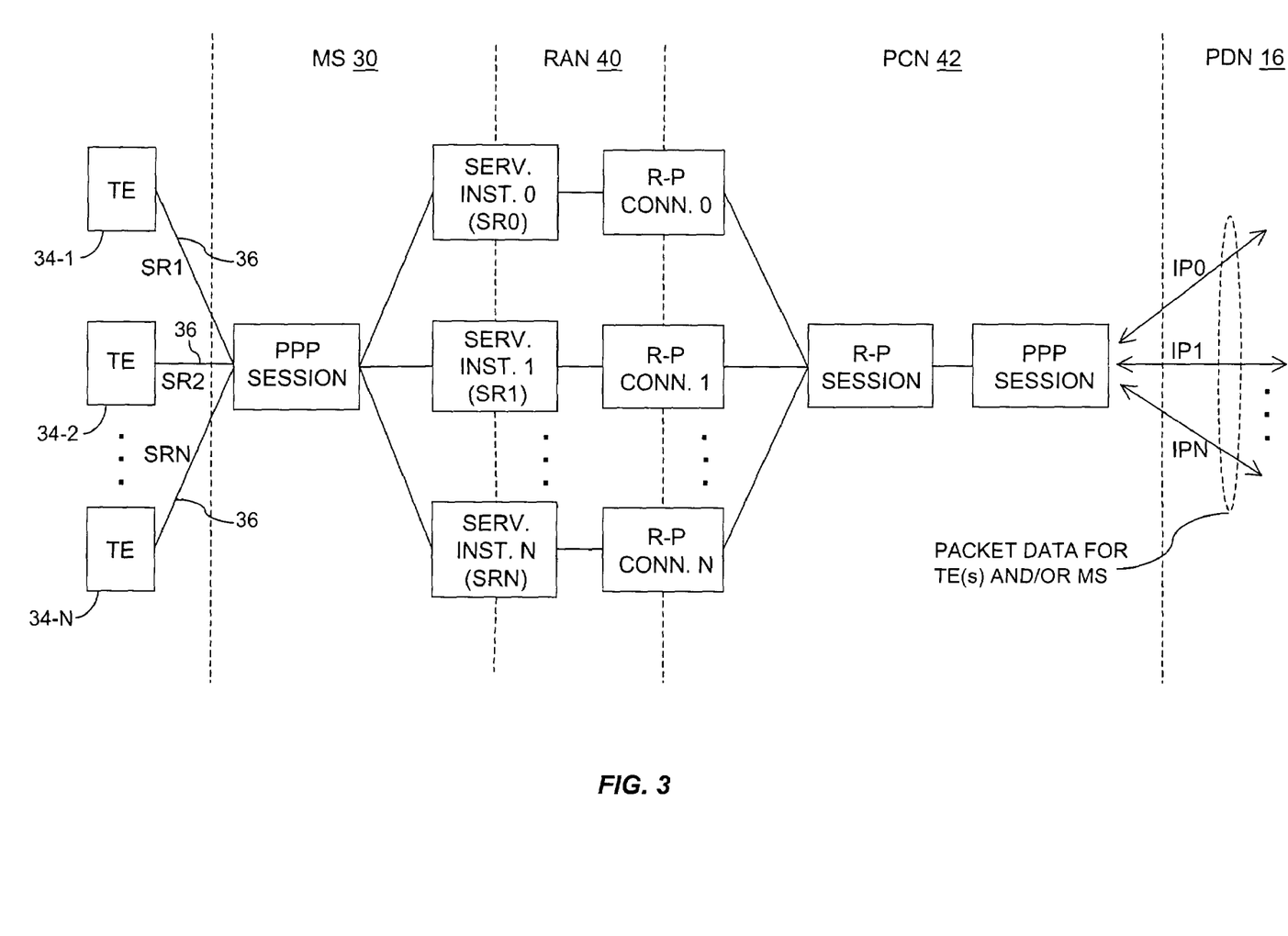
FIG. 3 is a diagram of the multiple service instances used to support the connection of peripheral devices within the context of the mobile station and supporting network of FIG. 2.

FIG. 3 functionally illustrates an exemplary use of multiple service instances supporting the interconnection of peripheral devices 34-1 through 34-N with network 32. In the context of the illustration, the mobile station 30 has established a data session with network 32, resulting in the establishment of a supporting PPP session and (Radio-Packet) R-P session. Further, the mobile station 30 has established a primary service instance (SR0) for itself and an auxiliary service instance for each of its N attached peripheral devices 34 (SR1 ... SRN). All service instances, including the primary service instance corresponding to the mobile station 30, are logically separate data connections but are carried over the single PPP session and corresponding R-P session.

Note that the network type may limit the number and/or logical arrangement of concurrent primary and auxiliary service instances. For example, the IS-835 standard permits up to six auxiliary service instances (see Section 10 of the IS-835 standard), thus allowing mobile station 30 to secure auxiliary service instances for up to six locally attached peripheral devices 34.

In operation, packet data flowing into PCN 42 from PDN 16 for the mobile station 30 or any of its attached peripheral devices 34 flows over the same PPP/R-P session, but is logically separated at the RAN 40 into a separate R-P connection for each service instance. Thus, connections R-P0 through R-PN correspond to service instances SR0 through SRN. Here, SR0 identifies the primary service instance of mobile station 30, and SR1 through SRN identifies the N auxiliary service instances of attached peripheral devices 34-1 through 34-N. Despite this logical separation, traffic for the collection of service instances flows over the same radio link 38 between the mobile station 30 and the network 32.

As the incoming packet data for the various service instances is received at the mobile station 30, its task is to direct that packet data to the appropriate destination (target). As such, the incoming data packets may need to be directed to one or more of the attached peripheral devices 34 via local connections 36, or retained for its own processing by the mobile station 30. The use of the multiple service instances, i.e., the mobile station's primary service instance plus an auxiliary service instance for each peripheral device 34, enables the mobile station 30 to efficiently perform such routing of data packets.

Such routing efficiency is gained, with commensurate decreases in processing overhead at mobile station 30, by exploiting the service instance markings applied by the network 32 to data packets targeted to the mobile station 30 and its locally attached peripherals 34. That is, incoming data packets received at mobile station 30 from network 32 include service instance identifiers, referred to as an SR_ID in the TIA/EIA/IS-835 standard, that may be efficiently determined by the mobile station 30 at the Layer 2 network level.

Thus, the mobile station 30 can perform Layer 2 switching of the received data packets using the SR_IDs of those data packets. This use of the SR_IDs enables the mobile station 30 to efficiently switch received data packets to the targeted peripheral devices 34 through the corresponding local connections 36, or to retain the packet(s) for local processing if marked for its primary service instance. Retained data packets may be processed by one or more mobile station applications executing within mobile station 30.

Figure 4:
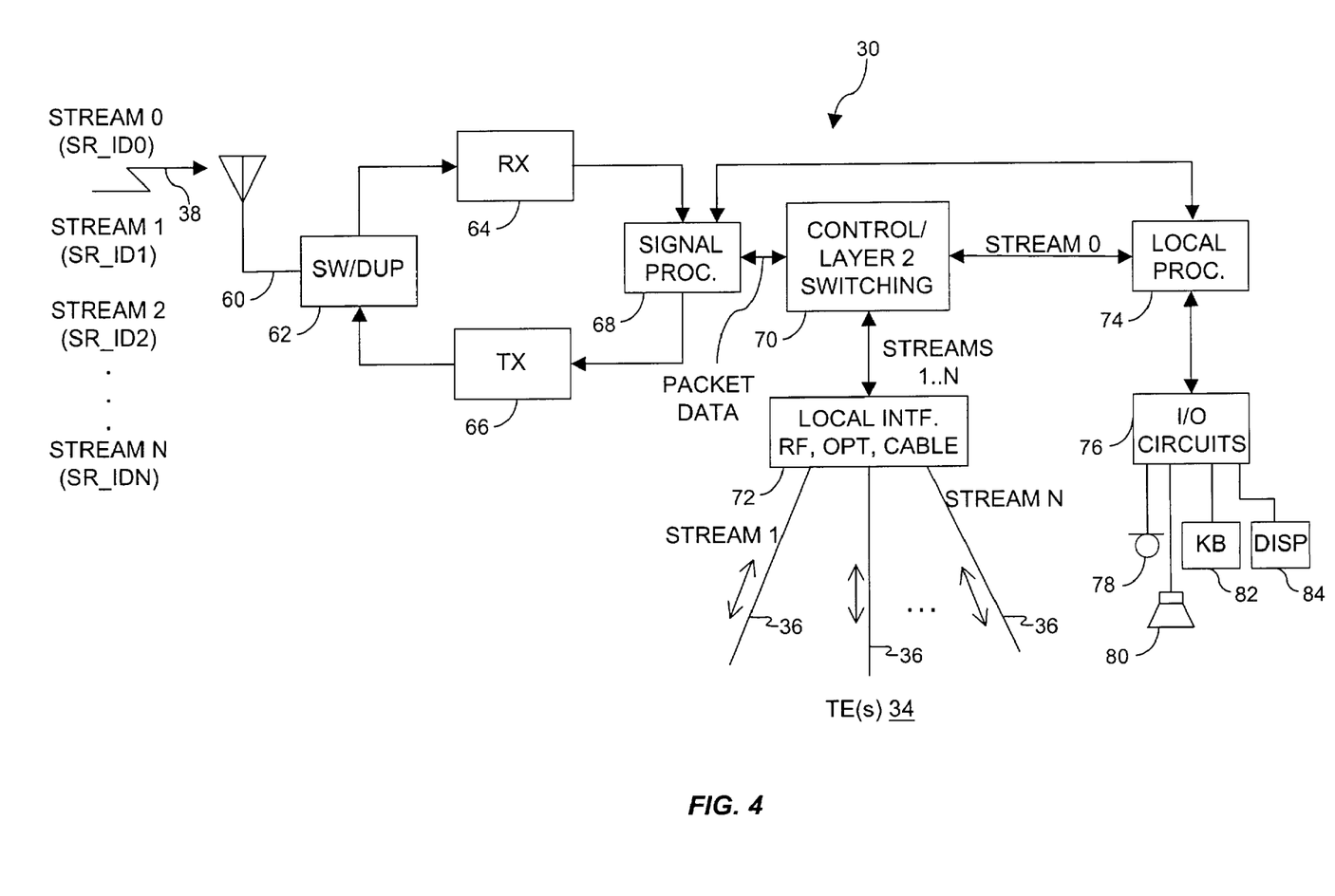
FIG. 4 is a diagram of an exemplary embodiment of the mobile station of FIG. 2.

An exemplary depiction of the mobile station 30 appears in FIG. 4 and illustrates one functional structure that may be used to support such operations. Here, the mobile station 30 comprises an antenna 60, a duplexer/switch 62, a transceiver including a receiver 64 and a transmitter 66, and one or more logic circuits including a first processor 68 for baseband signal processing, a second processor 70 for switching control (e.g., Layer 2 packet switching), and further including a third processor 74 supporting overall operations of the mobile station 30.

Processor 68 provides signal processing support (e.g., channel and error coding/decoding) and extracts data and signaling information from the signals received from network 32 through antenna 60 and receiver 64. For example, processor 68 may be configured to provide processor 70 with extracted packet data. By inspecting those extracted data packets at the Layer 2 level, processor 70 switches them to the local interface 72 for transfer to the corresponding peripheral devices 34 via the local connections 36. Similarly, packet data traffic and signaling, such as Mobile IP messaging, received by processor 70 from the peripheral devices 34 may be transferred to processor 68 for any required encoding operations and transfer to transmitter 66 for transmission to network 32 via wireless link 38.

Those skilled in the art will appreciate that processors 68, 70 and 74 may be implemented as one or more logic circuits comprising one or more microprocessors, programmable logic devices, and supporting circuits (e.g., clocks, memory, etc.). Alternatively, at least some of the functionality represented by one or all of such processors may be integrated into a larger processing device or devices, such as where the processors 68 and 70 separately or together form portions of an Application Specific Integrated Circuit (ASIC) or Field Programmable Gate Array (FPGA). Even processor 74, which provides overall system control, such as support for interface circuits 76, microphone 78, speaker 80, keyboard 82, and display 84, may be integrated into a larger logic circuit.

As those skilled in the art will appreciate, the ability to integrate various signal processing and digital logic enables the use of a few or even one integrated processor to accomplish many of the mobile station's required processing functions. Thus, it should be understood that processors 68, 70 and 74 might be integrated partially or fully within a single processing device, such as an Application Specific Integrated Circuit (ASIC) or microprocessor.

Further, one should note that the present invention contemplates essentially any means of attaching local peripheral devices 34 to mobile station 30. Thus, while not a limiting statement, the local connections 36 may be hardwired (e.g., cable), may be optical (e.g., infrared), radio frequency (e.g., Bluetooth), or any combination thereof. The connections 36 simply need to support some basic link protocol enabling the transfer of data between the peripheral devices 34 and the mobile station 30.

With this in mind, it should be understood that local interface 72 may comprise any combination of short-range wireless transceivers supporting one or more local wireless connections and one or more direct cable connections (e.g., hardwired ports) supporting local cabled connections. In exemplary embodiments, such short-range wireless transceivers might include Bluetooth interfaces, 802.11 interfaces, and/or optical networking interfaces.

Indeed, regardless of the manner in which peripheral devices 34 connect with the mobile station 30, the overall method is based on the mobile station 30 establishing a data session, and then securing a primary service instance for itself and the required number of auxiliary services instances for any attached peripheral devices 34. With this approach, the mobile station 30 in concert with the supporting network 32 can provide each peripheral device 34 with its own IP address, and, if desired, specific QoS settings, all without overburdening the mobile station 30 in terms of packet data routing overhead.

Figure 5:
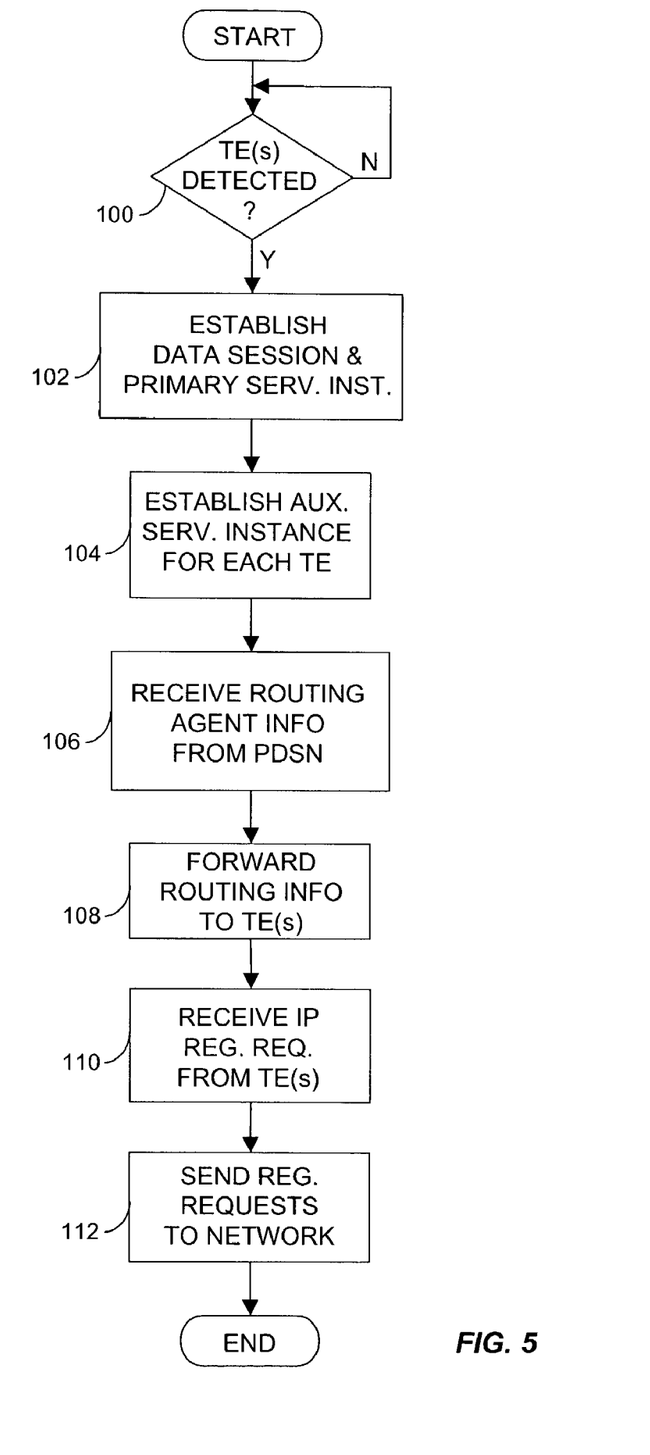
FIGS. 5 and 6 are diagrams of exemplary operating logic for the mobile station of FIG. 2.

FIG. 5 illustrates exemplary flow logic for mobile station operations. It should be understood that the illustrated functions represent processing tasks relevant to the use of auxiliary service instances for peripheral support, but omit other processing tasks which may be performed by the mobile station 30 in support of other concurrent operations. Thus, the illustrated functions may represent only a part of software/firmware instructions necessary to support the overall, ongoing operations of mobile station 30.

Relevant processing begins with mobile station 30 detecting whether any peripheral devices 34 are attached (Step 100). Such detection may be based on detecting, for example, a physical cable connection and/or the receipt of a query or handshake message on a local wireless interface within mobile station 30. If such a connection is not detected, the mobile station 30 may simply continue its monitoring, as illustrated, although it should be understood that it will likely continue with other tasks in parallel with such monitoring.

If the mobile station 30 does detect the connection of one or more peripheral devices 34, it establishes a data session, including the primary service instance, with the network 32, the establishment of which requires the mobile station 30 to perform registration and authentication in accordance with network requirements (Step 102). Once the primary service instance is established, the mobile station 30 requests an auxiliary service instance for each attached peripheral device 34 (Step 104). To do so, the mobile station 30 sends the required service requests to the network 32.

In response to receiving such requests, the network 32 sends routing agent information to the mobile station 30 for each requested auxiliary service instance (Step 106). In cdma2000 implementations of network 32, the PDSN 54 provides Foreign Agent (FA) routing information to the mobile station 30. The mobile station 30 forwards the received routing agent information via local connections 36 to each attached peripheral device 34 (Step 108). In response, each peripheral device 34 generates a registration request and transfers such request to the mobile station 30.

Mobile station 30 receives the registration requests from the peripheral devices 34 (Step 110) and relays them to the network 32 over wireless link 38 (Step 112). Network 32 registers each peripheral device 34 on the auxiliary service instance corresponding to that device 34 responsive to the registration requests. Mobile station 30 provides any Mobile IP clients that may reside in peripheral devices 34 with the ability to negotiate their own registrations and perform other Mobile IP functions on the common PPP session by serving as a relay for such Mobile IP messaging.

Thus, the mobile station 30 relays Mobile IP messages received from the network on a given auxiliary service instance to the corresponding locally attached peripheral device 34. Similarly, the mobile station 30 transfers Mobile IP messages, such as registration requests, received from a given peripheral device 34 to the network 32 on the auxiliary service instance corresponding to that peripheral device 34.

Figure 6:
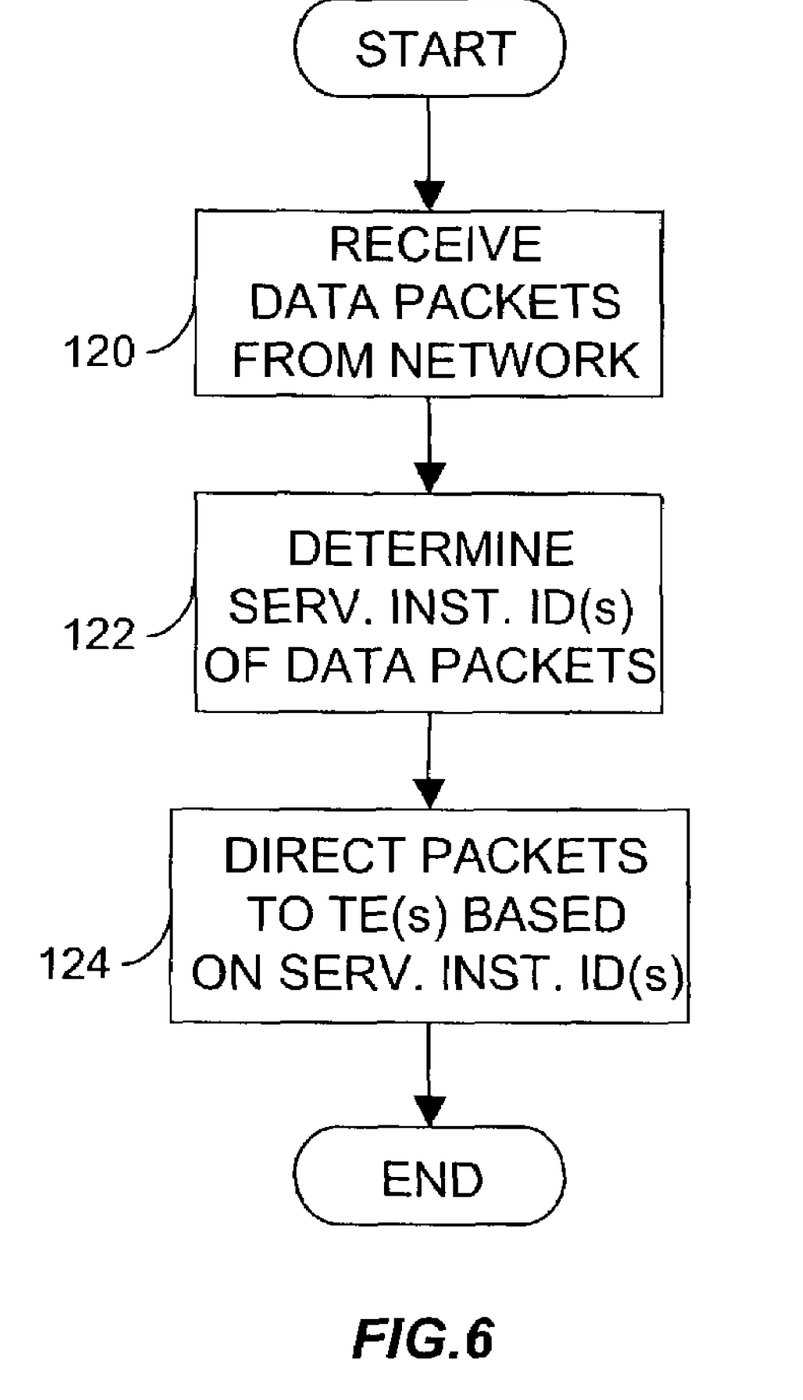

Once the data session and the service instances are established, the mobile station 30 serves as an aggregation point for incoming and outgoing packet data traffic to and from the peripheral devices 34. FIG. 6 illustrates basic mobile station operation in that respect. When the mobile station 30 receives incoming data packets from the network 32 (Step 120), such packets are marked with the corresponding service instance identifier (SR_ID). Thus, the mobile station 30 preferably determines the SR_ID of each received data packet (Step 122) at Layer 2, and uses that information to direct the received data packet to the targeted peripheral device 34 (or retain it for local processing by the mobile station 30) (Step 124). In general, data packets received on one of the auxiliary service instances are directed to the corresponding peripheral device 34, while data packets received on the primary service instance are retained for processing by the mobile station 30.

Note that, as mentioned earlier, each peripheral device 34 may secure a different QoS for one or more of the peripheral devices 34. In an exemplary implementation, one or more QoS "profiles" are stored for mobile station 30, with each profile defining one or more QoS parameters that can be used to establish QoS settings for a given packet data flow. Thus, the network 32 may use the QoS profiles to set the QoS for each requested auxiliary service instance, possibly using service type information associated with such requests. In cdma2000, for example, QoS profiles for mobile station 30 may be stored in the HA 58 for access by the PDSN 54. In other instances, such user-specific information may be stored in other network entities attached to the managed IP network 44, such that the data is available to the PCN 42.

Further, in some embodiments of the present invention, the mobile station 30 may query the attached peripherals 34 for particular QoS requirements, or may infer such requirements based on the application or service type(s) associated with the attached peripheral devices 34, and send specific QoS requirements to the network 32 for implementation on a per service instance basis.

Whether or not QoS differentiation is used among the auxiliary service instances, use of multiple service instances permits mobile station 30 to conveniently and efficiently support the interconnection peripheral devices 34 with network 32. While explained in the context of selected cdma2000 standards, those skilled in the art will recognize that the present invention has broad applicability beyond those standards, and beyond networks based on those standards. Thus, the present invention is limited not by the foregoing description but rather by the following claims and their reasonable equivalents.

What is claimed is:

1. A method of connecting one or more peripheral devices to a Public Data Network through a mobile station supported by a wireless communication network providing access to the Public Data Network, the method comprising:

establishing a data session between the mobile station and the supporting network, the data session comprising a primary service instance for the mobile station and an auxiliary service instance for each peripheral device;

receiving packet data at the mobile station from the supporting network, the packet data for each service instance being marked by the supporting network with a service instance identifier; and directing the packet data from the mobile station to the one or more peripheral devices based on the service instance identifiers;

wherein establishing a data session between the mobile station and the supporting network comprises:
registering the mobile station with the supporting network;
requesting a primary service instance for the mobile station and an auxiliary service instance for each peripheral device;
receiving routing agent information at the mobile station from the supporting network for the auxiliary service instances and transferring that routing agent information to the one or more peripheral devices; and
receiving registration requests at the mobile station from the one or more peripheral devices and transferring those registration requests to the supporting network to register each peripheral device with the supporting network.

2. The method of claim 1, wherein the mobile station establishes the data session with the supporting network according to the IS-835 standard defined for cdma2000-based networks.

3. The method of claim 1, wherein directing the packet data from the mobile station to the one or more peripheral devices based on the service instance identifiers comprises performing Layer 2 switching of data packets at the mobile station.

4. The method of claim 1, wherein directing the packet data from the mobile station to the one or more peripheral devices based on the service instance identifiers comprises performing Layer 2 switching of data packets at the mobile station based on the service instance identifiers of the data packets.

5. The method of claim 1, further comprising retaining at the mobile station packet data received from the network on the primary service instance.

6. The method of claim 1, further comprising connecting the mobile station to the one or more peripheral devices via a local wireless or wired link.

7. The method of claim 1, further comprising connecting the one or more peripheral devices to the mobile station through a Bluetooth wireless communication link.

8. The method of claim 1, further comprising requesting a desired Quality-of-Service (QoS) for each auxiliary service instance, such that the QoS can be set for each peripheral device.

9. The method of claim 1, wherein establishing the data session comprises establishing the primary and auxiliary service instances responsive to detecting a local attachment of at least one peripheral device to the mobile station.

10. The method of claim 1, further comprising:
transferring Mobile IP messages received from the network for each auxiliary service instance to the corresponding peripheral device; and
transferring Mobile IP messages received from each peripheral device to the network via the corresponding auxiliary service instance.

11. The method of claim 10, wherein transferring Mobile IP messages received from the network comprises:
receiving a Foreign Agent advertisement message from the network on an auxiliary service instance; and
relaying the Foreign Agent advertisement message to a corresponding peripheral device via a local connection between that peripheral device and the mobile station.

12. The method of claim 10, wherein transferring Mobile IP messages received from each peripheral device comprises:
receiving a Registration Request message from a peripheral device via a local connection between the peripheral device and the mobile station; and
relaying the Registration Request message to the network via the corresponding auxiliary service instance.

13. A method of supporting peripheral devices connected to a cdma2000 network through a mobile station, the method comprising:
establishing a data session between the mobile station and the cdma2000 network that includes a primary service instance for the mobile station and an auxiliary service instance for each peripheral device having a local connection with the mobile station;
registering each peripheral device with the cdma2000 network through the auxiliary service instance corresponding to that peripheral device; and
transferring packet data between each peripheral device and the cdma2000 network via the mobile station on a corresponding auxiliary service instance;
wherein packet data targeted to each peripheral device is marked by the cdma2000 network with a service instance identifier corresponding to the auxiliary service instance established for that peripheral device and wherein transferring packet data between each peripheral device and the cdma2000 network via the mobile station on a corresponding auxiliary service instance comprises receiving packet data for each peripheral device at the mobile station from the network and directing packet data to the corresponding peripheral device based on determining the service instance identifier of the packet data.

14. The method of claim 13, further comprising recognizing a local attachment of a peripheral device to the mobile station, and establishing the data session between the mobile station and the cdma2000 network responsive to recognizing the local attachment.

15. The method of claim 14, wherein recognizing a local attachment of a peripheral device to the mobile station comprises recognizing an activation of a local communication link with the peripheral device.

16. The method of claim 15, wherein recognizing an activation of a local communication link with the peripheral device comprises detecting a cable attachment.

17. The method of claim 15, wherein recognizing an activation of a local communication link with the peripheral device comprises detecting communications from the peripheral device.

18. The method of claim 13, wherein registering each peripheral device with the cdma2000 network through the auxiliary service instance corresponding to that peripheral device comprises:
receiving routing agent information from the cdma2000 network;
transferring the routing agent information to each peripheral device;
receiving a registration request from each peripheral device responsive to the transferred routing agent information; and
sending the registration requests from the mobile station to the cdma2000 network.

19. The method of claim 13, wherein the mobile station requests a service type for each auxiliary service instance based on the corresponding peripheral device.

20. The method of claim 13, wherein the mobile station requests a Quality-of-Service for each auxiliary service instance based on the peripheral device corresponding to that auxiliary service instance.

21. The method of claim 13, wherein establishing a data session between the mobile station and the cdma2000 network that includes a primary service instance for the mobile station and an auxiliary service instance for each peripheral device having a local connection with the mobile station comprises establishing a common PPP session used by the primary and auxiliary service instances.

22. The method of claim 21, wherein establishing the data session further comprises establishing separate Internet Protocol (IP) address for the mobile station and each peripheral device.

23. The method of claim 13, wherein directing packet data to the corresponding peripheral device based on determining a service instance identifier (SR_ID) of the packet data comprises performing Layer 2 data packet switching in the mobile station based on detecting the SR_ID of each data packet.

24. The method of claim 13, further comprising transferring mobile station application data between the mobile station and the cdma2000 network on the primary service instance.

25. The method of claim 24, further comprising retaining at the mobile station packet data received from the network on the primary service instance.

26. A mobile station for use in a wireless communication network, the mobile station comprising:
a transceiver for sending and receiving packet data to and from the network;
a local interface for locally connecting with one or more peripheral devices; and
at least one logic circuit to:
establish a data session between the mobile station and the supporting network, the data session comprising a primary service instance for the mobile station and an auxiliary service instance for each peripheral device;
receive packet data at the mobile station from the supporting network, the packet data for each service instance being marked by the supporting network with a service instance identifier; and
direct the packet data received at the mobile station through the local interface to the one or more peripheral devices based on the service instance identifiers;
wherein the logic circuit establishes the data session by:
registering the mobile station with the supporting network;
requesting a primary service instance for the mobile station and an auxiliary service instance for each peripheral device;
receiving routing agent information at the mobile station from the supporting network for the auxiliary service instances and transferring that routing agent information to the one or more peripheral devices; and
receiving registration requests at the mobile station from the one or more peripheral devices and transferring those registration requests to the supporting network to register each peripheral device with the supporting network.

27. The mobile station of claim 26, wherein the local interface comprises at least one of a short-range wireless interface and a direct attachment interface.

28. The mobile station of claim 27, wherein the short-range wireless interface comprises a short-range radio interface.

29. The mobile station of claim 27, wherein the short-range wireless interface comprises an optical interface.

30. The mobile station of claim 26, wherein the at least one logic circuit comprises:
a first processor coupled to the transceiver to obtain received data packets from a received signal; and
a second processor coupled to the first processor and the local interface to direct the data packets to the corresponding peripheral devices based on determining the service instance identifiers of the received data packets.

31. The mobile station of claim 30, wherein the second processor comprises a Layer 2 switching controller that switches data packets based on the service instance identifiers of the data packets.

32. The mobile station of claim 30, wherein the first processor is a signal processor coupled to receive and transmit elements of the transceiver, and configured to provide baseband processing of a received signal to extract the received data packets and to provide baseband processing of outgoing data packets for transmission via the transceiver.

33. The mobile station of claim 26, wherein the logic circuit comprises an ASIC configured to forward received data packets to corresponding ones of the peripheral devices based on the service instance identifiers of the data packets.

34. The mobile station of claim 26, wherein the logic circuit is configured to retain at the mobile station data packets received from the network on the primary service instance.

35. The mobile station of claim 26, wherein the logic circuit retains packet data received from the network on the primary service instance for processing by the mobile station, and directs packet data received from the network on the auxiliary service instances to corresponding ones of the peripheral devices.

36. The mobile station of claim 26, wherein the mobile station is configured to establish the data session with the supporting network according to the IS-835 standard defined for cdma2000-based networks.

37. The mobile station of claim 26, wherein the mobile station directs the packet data to the one or more peripheral devices by performing Layer 2 switching of data packets the service instance identifier of each data packet.

38. The mobile station of claim 26, wherein the mobile station is configured to:
transfer Mobile IP messages received from the network for each auxiliary service instance to the corresponding peripheral device; and
transfer Mobile IP messages received from each peripheral device to the network via the corresponding auxiliary service instance.

39. The mobile station of claim 38, wherein the mobile station transfers a Mobile IP Foreign Agent advertisement message received from the network on an auxiliary service instance to the corresponding peripheral device via the local interface.

40. The mobile station of claim 38, wherein the mobile station transfers Mobile IP Registration Request messages received from a peripheral device via the local connection to the network via the corresponding auxiliary service instance.

* * * * *

UNITED STATES PATENT AND TRADEMARK OFFICE
CERTIFICATE OF CORRECTION

PATENT NO. : 7,468,968 B2
APPLICATION NO. : 10/271603
DATED : December 23, 2008
INVENTOR(S) : Svensson et al.

It is certified that error appears in the above-identified patent and that said Letters Patent is hereby corrected as shown below:

On the Title Page, in Item (56), under "U.S. PATENT DOCUMENTS", in Column 2, Line 1, delete "370/338" and insert -- 455/436 --, therefor.

In Column 5, Line 23, delete "(SRO)" and insert -- (SR0) --, therefor.

Signed and Sealed this

Twenty-seventh Day of October, 2009

David J. Kappos
*Director of the United States Patent and Trademark Office*